Figures 23, 24:
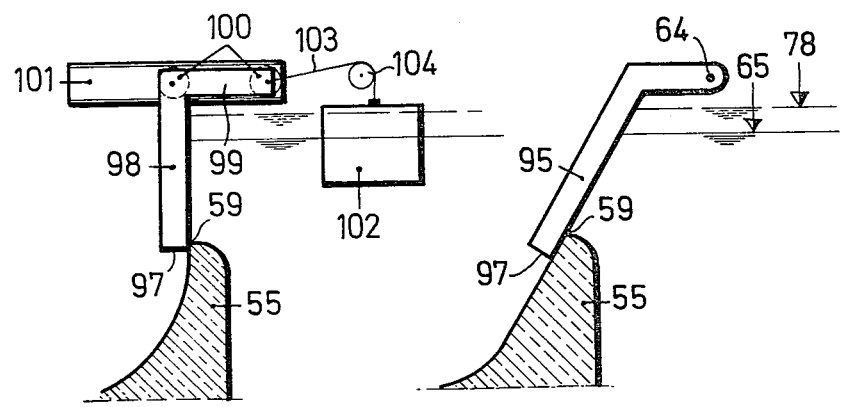

United States Patent [19]

Ernst et al.

[11] 4,225,434
[45] * Sep. 30, 1980

[54] STORM OVERFLOW BASIN

[76] Inventors: Wilhelm Ernst, 4 Böcklerstrasse, 4600 Dortmund-Aplerbeck; Hubert Ernst, 6, Am Dümel, 5780 Bestwig-Nuttlar, both of Fed. Rep. of Germany

[*] Notice: The portion of the term of this patent subsequent to Sep. 30, 1995, has been disclaimed.

[21] Appl. No.: 657,462

[22] Filed: Feb. 12, 1976

[30] Foreign Application Priority Data

Feb. 13, 1975 [DE] Fed. Rep. of Germany ....... 2506126
Jan. 31, 1976 [DE] Fed. Rep. of Germany ....... 2603665

[51] Int. Cl.³ ............................................. B01D 21/24
[52] U.S. Cl. ...................................... 210/98; 137/397; 405/46; 210/128; 210/137; 210/170; 210/534
[58] Field of Search ................... 61/26; 137/446, 398, 137/448, 397; 210/170, 128, 172, 534, 98, 134, 137; 405/98, 89, 100, 101

[56] References Cited

U.S. PATENT DOCUMENTS

| 332,895 | 12/1885 | Harding | 405/96 |
| 433,134 | 7/1890 | Hiesen | 210/534 X |
| 439,517 | 10/1890 | Ivey et al. | 405/96 |
| 2,018,383 | 10/1935 | Schofield | 137/397 X |
| 2,170,200 | 8/1939 | Karnes | 405/96 X |

FOREIGN PATENT DOCUMENTS 237370 of 1913 Fed. Rep. of Germany ........... 210/534
3326 of 1884 United Kingdom ..................... 137/397

Primary Examiner—Frank A. Spear, Jr.
Attorney, Agent, or Firm—Meyer, Tilberry & Body

[57] ABSTRACT

A storm overflow basin for use, e.g. in combined sewage systems has a storage tank leading to a storm overflow unit having a restricted sewage discharge and a storm overflow, the latter being provided with a weir at which there is mounted a flap gate engaging the crest of the weir with its bottom edge and being operable by float controlled means in dependence upon the water level in the storm overflow unit, to move away from the crest of the weir when storm conditions require a controlled overflow discharge. The normal sewage discharge is provided with restriction means that are also float controlled.

20 Claims, 30 Drawing Figures

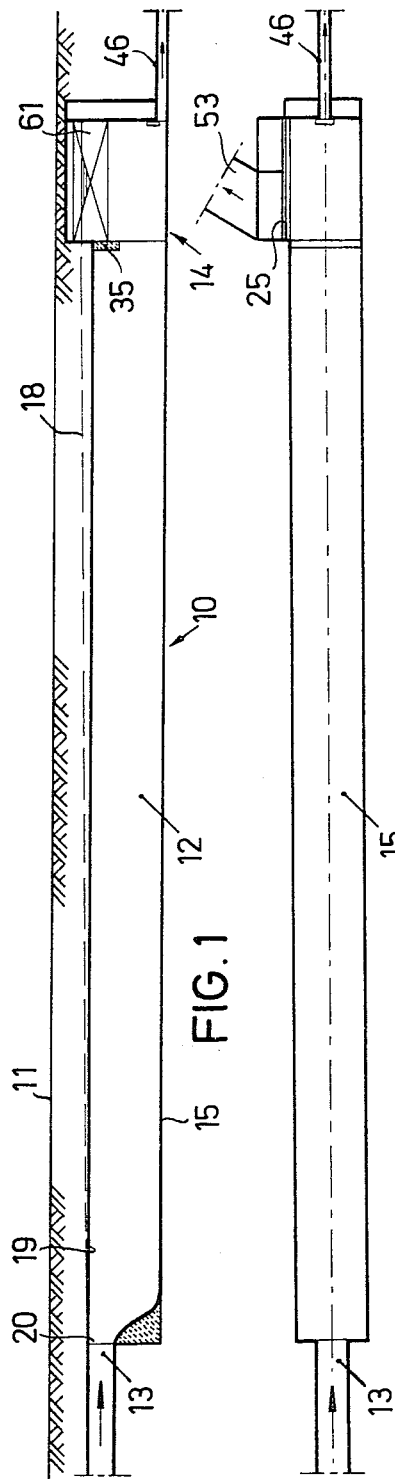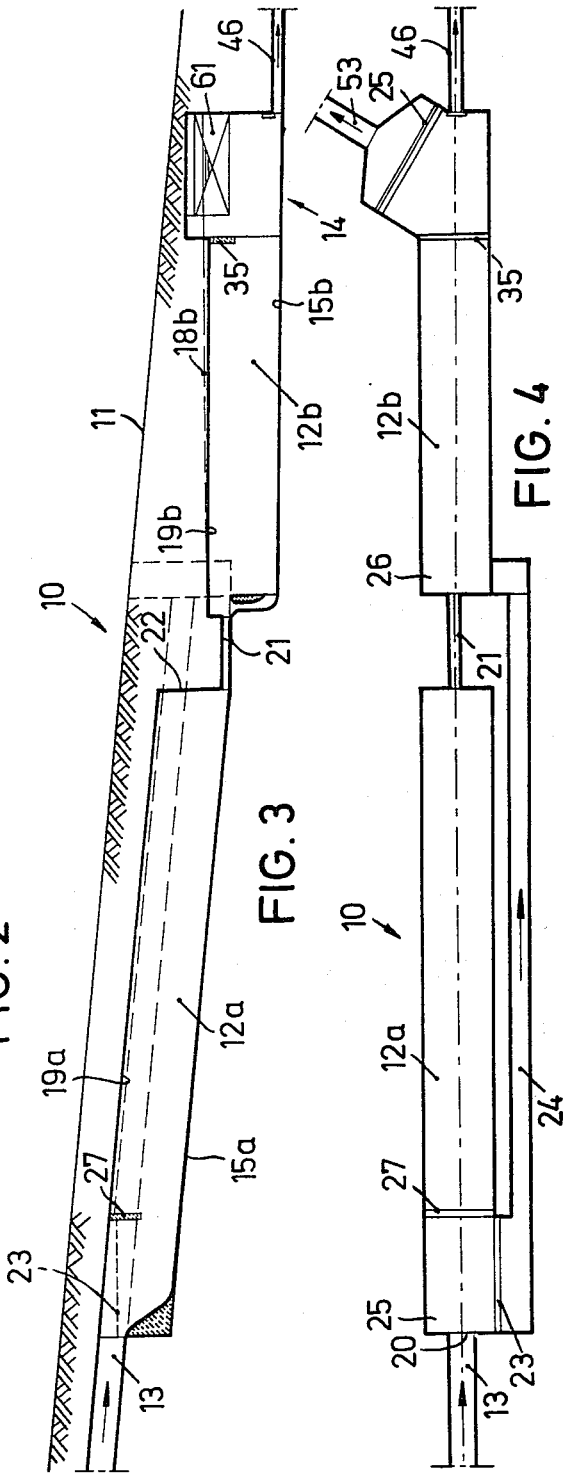

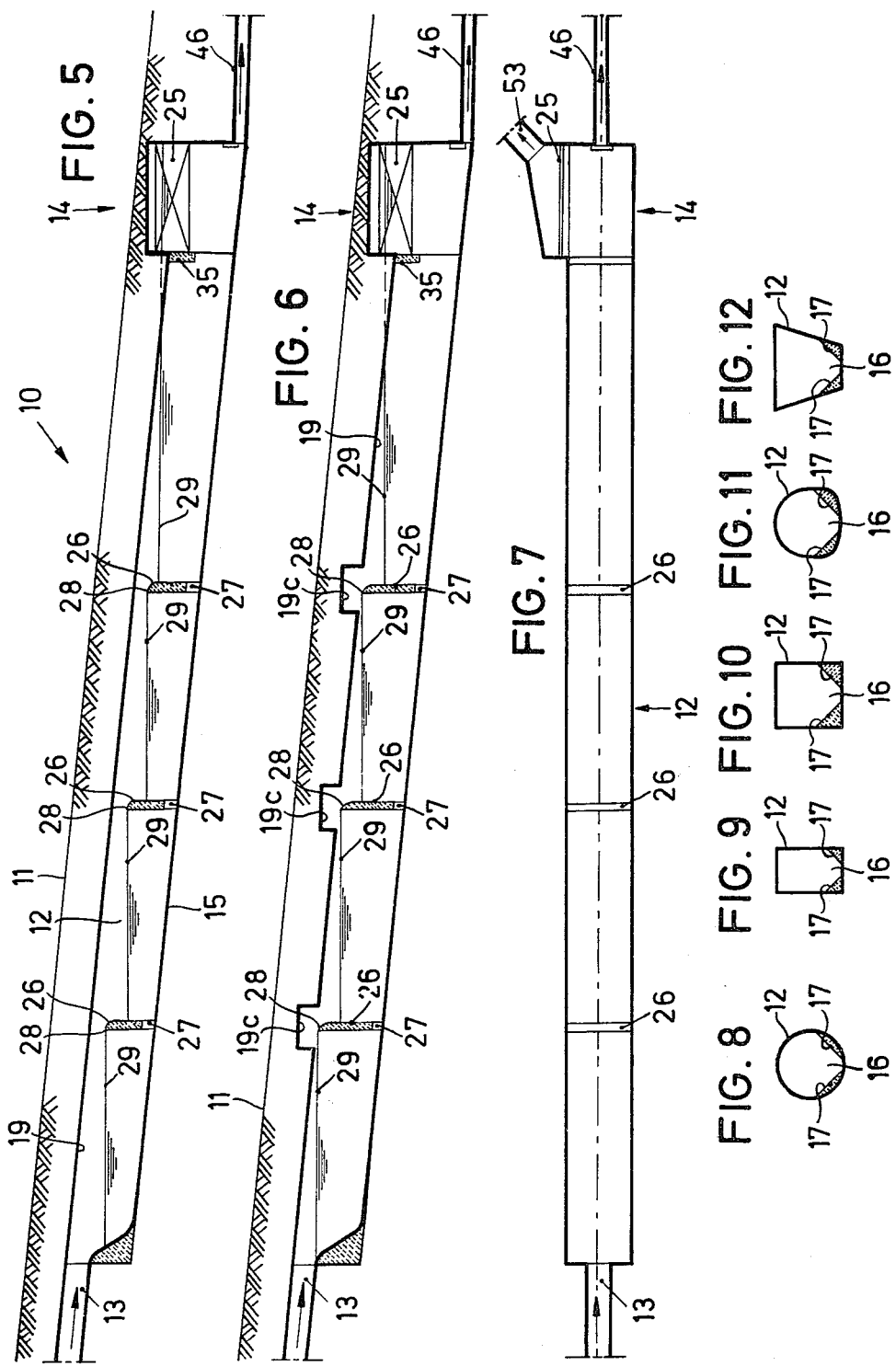

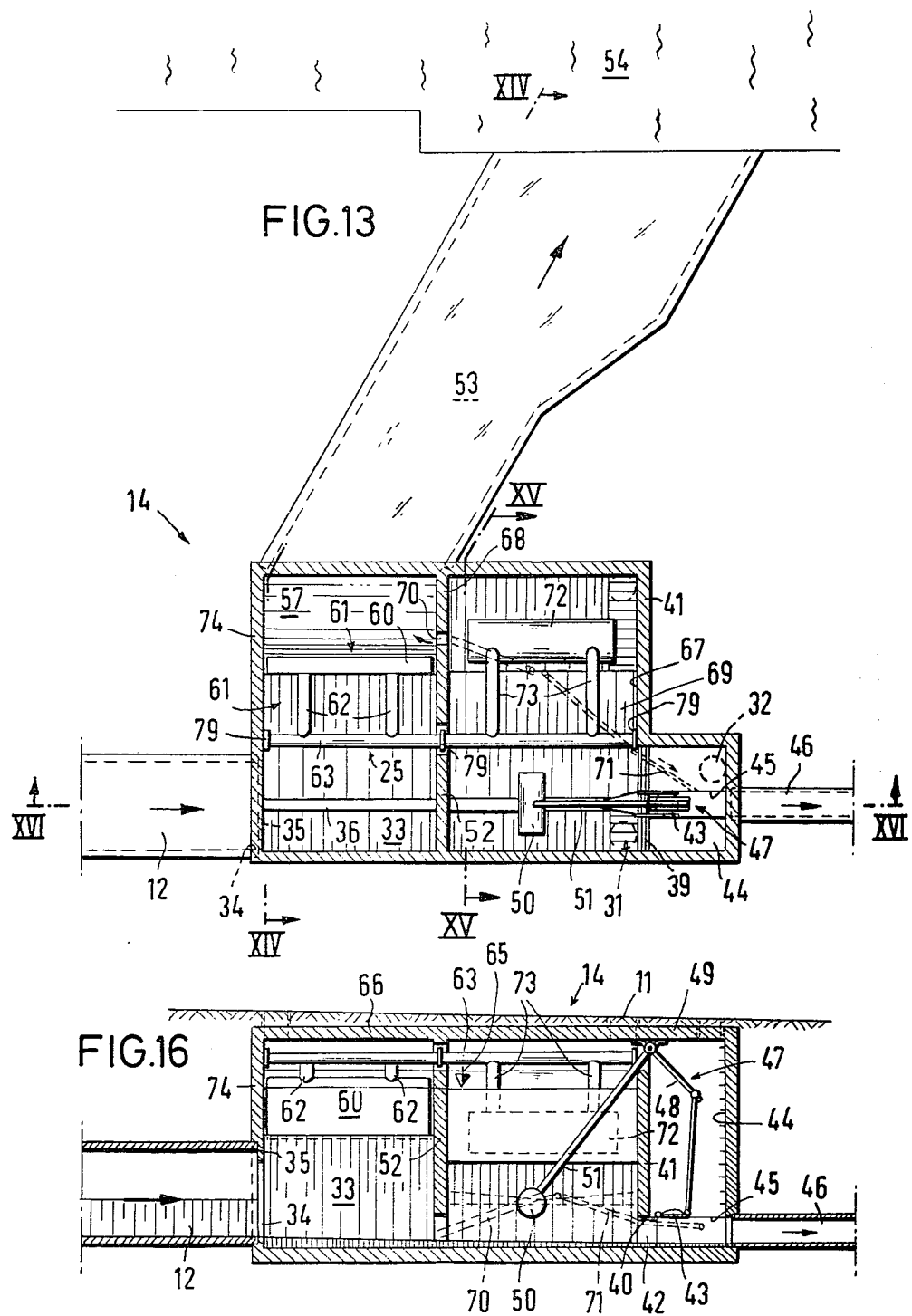

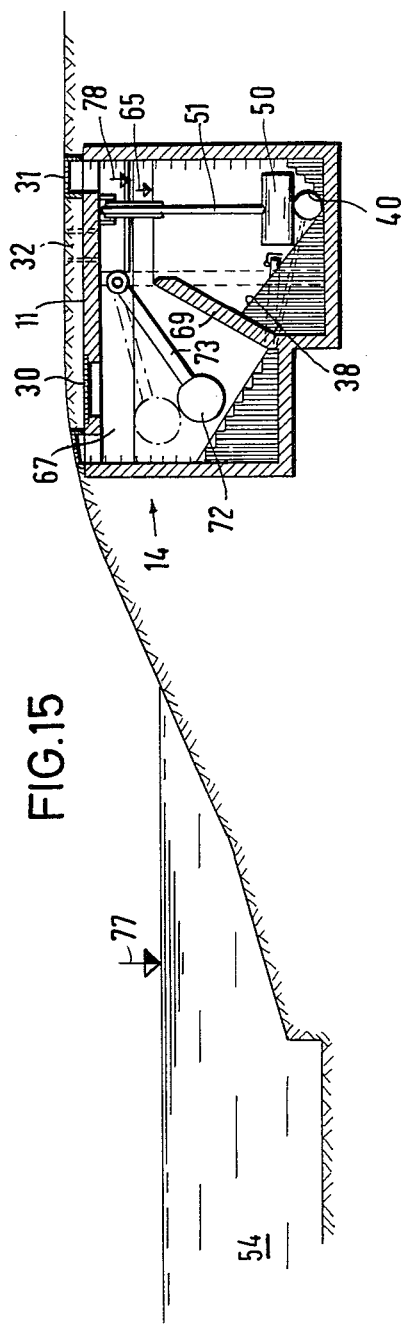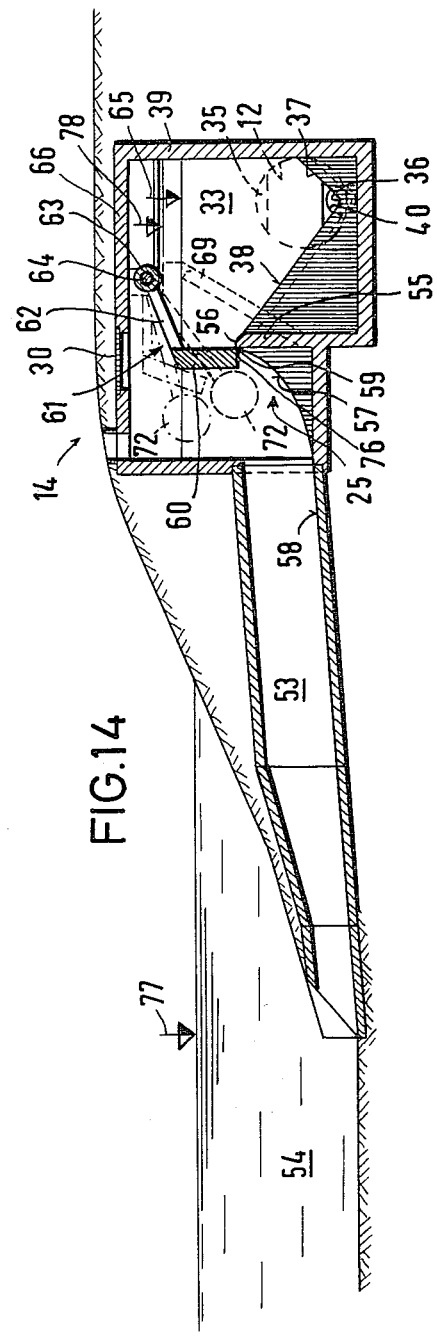

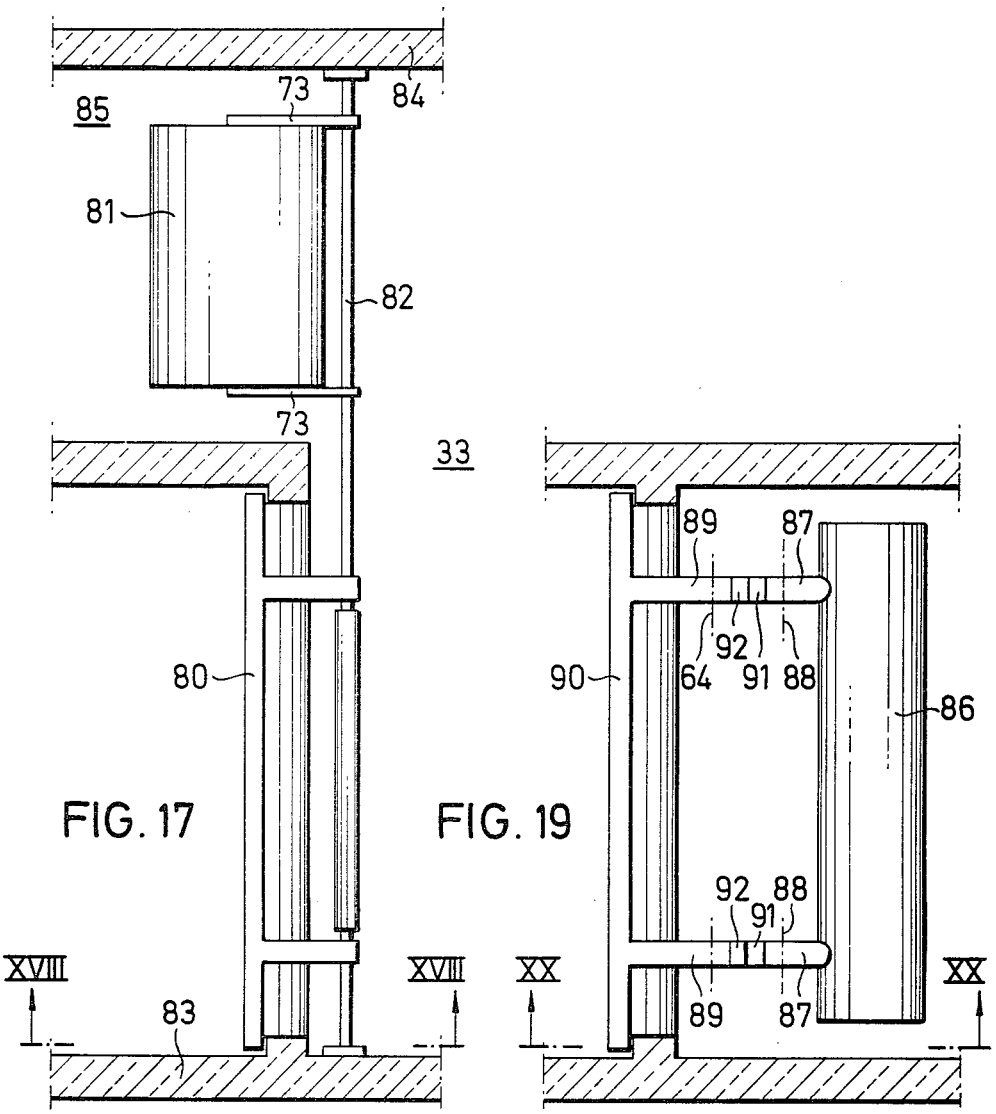

STORM OVERFLOW BASIN

FIELD OF THE INVENTION

The invention relates to a storm overflow basin, particularly but not necessarily for combined sewage systems, having a storage tank and a storm overflow facility unit at least one inlet, a storm overflow and a throttled or restricted sewage discharge.

SUMMARY OF THE PRIOR ART

For drainage purposes in populated areas, sewage and storm water are removed either in separate underground sewers or together in the same sewage system (combined sewage system). Since the quantity of storm water required to be removed varies more than the quantity of sewage and is, as a rule, considerably greater than the amount of sewage, the sewers for the combined system must be designed to deal satisfactorily with the inputs of sewage and storm water.

With the aim of providing a sewer section which is cost-effective and ensures a satisfactory flow of the relatively small proportion of sewage in dry weather, storm overflow units are provided whose function is to provide relief when needed for the sewer network and associated treatment plant by diverting some of the combined water of the mixed system into a receiving stream, so that the quantity supplied to the treatment plant is no more than the quantity that the plant can process.

To limit contamination of the receiving flows and streams by untreated combined sewage, the diverted flow may enter the receiving stream by direct overflow only when the soil percentage of the water to be discharged has been reduced to a level such that there is no further risk of appreciable contamination of the receiving stream. For this purpose it is known to restrict the sewage discharge from the storm overflow unit and to combine the storm overflow with a storage tank or reservoir or the like which first stores combined sewage having a relatively high percentage of soil, then delivers its contents with some delay to the treatment plant upon a lessening or cessation of precipitation, when the inflow to the storage reservoir and to the storm overflow unit drops. The combination of a storage tank of this kind with a storm overflow unit is termed a storm overflow basin or reservoir. The storm overflow of such a storm overflow basin starts only when the storage tank is full and the rate of inflow to the storm overflow unit exceeds the maximum amount of water that can be received and processed by the sewage treatment plant.

As a rule, a sewage network is designed with an eye to the future so that it may satisfy future requirements. As a catchment area becomes increasingly built up, the loading of the sewage network and the storm overflow facilities increases, the quantity of storm water and sewage increasing too. Also, in the case of relatively old sewage systems it may become necessary to increase the critical quantity of combined sewage and to increase the volume of the storage tank.

Among the objects of particular embodiments of the invention to be described is the provision of a storm overflow basin which can be enlarged subsequently and which can be completely ponded and whose storage capacity is fully usable independently of the inflow, and in which the quantity of combined sewage to be conveyed to the sewage treatment plant remains constant independently of the storage tank water level and in which not only settling but also floating contaminants, such as oil, grease and floating solids, are held back and cannot pass over the overflow into the receiving stream.

SUMMARY OF THE INVENTION

A storm overflow basin according to the invention comprises a flap gate mounted at or near its top edge and which opens and closes in dependence upon the water level in the storm overflow unit.

With a flap gate or weir of this form it is possible to provide a subsequent raising of the capacity level of a storm overflow basin whose storm overflow unit has a fixed weir sill. The storage space of an existing storage tank can therefore be increased subsequently and the critical quantity of combined sewage can also be increased. Another advantage of a top-mounted gate is that, when the storm overflow begins and combined sewage or contaminated storm water enters the receiving stream directly, the gate acts as a trash board and retains contaminants, such as floating solids, on the surface of the water. The bottom edge of the gate disengages from the closure seating of the weir so that there is not an overflow over the gate; instead, the diverted water relief is removed below the capacity level of the storage reservoir to be discharged into the receiving stream.

The storm overflow can have a fixed weir sill whose crest is abutted by the bottom edge of the gate flap. Consequently, contaminants on the bottom of the storm overflow facility are also held back, so that only mechanically purified combined sewage reaches the receiving stream.

The gate flap is preferably pivotable about a pivot disposed near its top edge. Conveniently in this case, the gate pivot is disposed at a lateral spacing from the closure seating for the gate. The gate therefore closes automatically by its own weight, to be opened by the water pressure only when the water level rises.

Also, when in its closed position the gate flap can be inclined downwards and outwards to a flood relief channel and engage by way of its bottom edge with the closure seating of the storm overflow. The gate flap may be connected to a weight which acts at a distance from the outside surface of the gate and which assists the closure operation.

For automatic opening and closure of the gate, the gate flap can be connected to a float which rises and falls with the water level in the storm overflow unit. The float can be rigidly connected by lever arms to the gate flap or one of the parts thereof, or as another possibility the float can be mounted by way of lever arms on a float shaft and connected to the gate flap by way of gearing. The advantage of this feature is that the use of appropriate floats makes it possible to open and close heavy and high flaps and to provide a variety of capacity levels. Very conveniently, the gate flap and float can be mounted one beside another on a common shaft: a system of this kind takes up very little space since the length of the gate or weir sill is reduced considerably by the provision of the flap gate, and so there is space adjacent the gate for the float, and this is not disposed in the main flow of the combined sewage.

Very conveniently, the flap-actuating float can be disposed in a special float chamber; which is completely separated from the flood relief channel and which is separated from the flow chamber in the storm overflow unit by an overflow sill, the edge thereof being disposed slightly below the top edge of the gate flap at the capacity level of the storage tank. The advantage of this feature is that the float forces the flap into its closed position until the capacity level in the storm overflow unit has been reached. The float chamber fills with water only once that level is exceeded, so that the float rises and the flap opens. Also, the closed flap prevents excess head in the sewage network when, in the event of flooding in the receiving stream, the water thereof rises in the relief channel.

Conveniently, the float chamber has an emptying line connected to the sewage discharge line. The float chamber therefore empties automatically as the inflow of combined sewage from the basin drops, even when there is a backwater or head in the relief channel from the receiving stream in flood conditions. Flood water cannot therefore flow into the storm overflow unit. Also, the contaminated water entering the float chamber to lift the float cannot enter the receiving stream but is supplied to the sewage treatment plant.

The float chamber can of course have a secondary emptying line connected to the flood relief channel. The float chamber can then empty into the receiving stream in the absence of backwater in the relief channel. The advantage of this feature is that the quantity of sewage supplied to the treatment plant is unaffected by the discharge from the float chamber, and so the sewage discharge can be metered more accurately.

The float of the gate flap can be connected to an electrical drive for the gate flap. The float then serves just as a control element for the drive, e.g., and electric motor which is stopped and started in dependence upon the height of the float.

In another form of the storm overflow basin, the gate flap can be guided by its top edge running on rollers in rails, in this case the flap, instead of being pivotable around its top edge, can be arranged to move parallel to itself on rails. Conveniently in this case, the flap is driven by a float connected to the flap by means such as a rope or cable or the like. The float can be disposed in a separate float chamber. This embodiment is very convenient when little space is available above the gate for the mounting and drive of the gate flap.

Clearly, in a construction according to the invention it is possible to arrange to make full use of the storage space of the storage basin independently of the extent of development of the associated catchment area or of the input of combined sewage, since the flap gate or weir opens only when the predetermined capacity level has been reached. The water going over the weir into the relief channel has already been cleaned mechanically, since the combined inflow in the storage basin undergoes additional settling. The frequency and the run time of the combined-water diversion, and therefore the contaminant yielded to the receiving stream, are reduced and there is a considerable reduction in the discharge of suspended substances into the receiving stream. Also, for a given loading of the receiving stream, the storm overflow basin described herein can be of smaller dimensions than a storm basin which is provided after the storm overflow and before the treatment plant. The provision of the gate valve considerably reduces the length of the weir in the storm overflow unit, so that the unit can be much smaller than the known constructions.

In the event of flood conditions in the receiving stream the gate flap prevents excess head in the sewage network. If a slight excess head is permitted therein, combined sewage can be discharged to the receiving stream even in flood conditions thereof.

Another preferred feature of the invention is that all the bearings of the gate flap and of the float and of all the other operating means of the flap gate are disposed above the highest water level, thus facilitating maintenance and reducing wear. The gate flap can be arranged to operate automatically by its own weight or with a float drive without having to use external energy, the float providing effective stabilization of the flap in the open position thereof.

Conveniently, since the quantity of water flowing through the sewage discharge to the treatment plant increases when the capacity level of the storm overflow basin is increased, the sewage discharge of the storm overflow unit has a restricting or throttling device which is adjustable in dependence upon the water level in the unit. Consequently, the quantity of sewage flowing to the treatment plant can be kept constant independently of the water level in the overflow unit, and so there is no need to provide extra storage basins or reservoirs for the plant itself.

The adjustable restricting device can be a gate valve which is disposed before the sewage discharge and which is actuated by a float disposed in the storm overflow unit. When the water level rises in the overflow unit, the float closes the valve increasingly so that the sewage discharge is further restricted and is adapted to the higher pressure in the head water.

The restrictor-actuating float can be mounted on one end of a two-armed lever which is disposed above the highest possible water level in the storm overflow unit and whose other end engages in the slot of an interchangeable cam plate connected to the restricting device. This feature makes it possible to adapt the operation of the restricting element to various capacity levels just by changing the cam disc and by varying the discharge characteristics. When the sewage inflow increases, e.g. because of new housing and industrial development, the new discharge conditions can be dealt with just by changing the cam disc.

The restricting device can be a throttle flap which can be received in a shaft or gallery or the like disposed between the sewage discharge line and the flow chamber of the storm overflow unit, the sewage discharge of the flow chamber extending to the shaft or gallery, the float-mounted means for actuating the restricting device being disposed in the shaft or gallery. The advantage of using a throttle flap instead of a gate is that, unlike a gate, a throttle flap requires no guides likely to pick up pieces of foreign matter which may prevent the restriction from operating satisfactorily. Placing the throttle flap in a special shaft or gallery after the flow chamber ensures that even relatively large pieces of foreign matter cannot upset its operation. The actuating linkage for the throttle element is not disposed in the combined sewage but is readily accessible in the shaft or gallery for inspection and repair.

Conveniently, when the float for the restricting device is disposed in the flow chamber of the storm overflow unit, a trash board is provided in that chamber to prevent the float from being damaged by floating matter and to prevent the float from being affected by differing flow pressures of the inflow.

The float for the restricting device can be disposed in a shaft or gallery which follows on the storm overflow unit, the float being adapted to rise and fall in such shaft or gallery in dependence upon the water level. Controlling the restricting device by the tail water in this way has the advantage of improved throttle-element regulation, since in the event of a disturbance in the sewage discharge the water level in the shaft or gallery drops immediately and the throttle element opens fully. Any blockage or jamming or the like is then usually cleared rapidly by the water entering the sewage discharge at high pressure and above the critical speed.

To make as sure as possible that floating solids and coarse floating impurities are kept away from the storm overflow unit in full capacity conditions, a trash board can be disposed in the entry of the storm overflow unit. Very conveniently, the storage tank which precedes the storm overflow unit is disposed underground in the sewer route and has its floor formed with a trough which is dimensioned to suit the dry weather flow of the sewage system and which has steeply inclined side walls. An elongated tank or reservoir of such a kind can be disposed in the sewer route in the public street area and be devised, just like a sewage network, from prefabricated pipes which are in cross-section rectangular or jaw-shaped or ovoid of appropriately large diameter. The inflowing contaminated storm water or mixed water flows uniformly and, depending upon the increase in cross-section, more slowly through such a tank or basin than through the remainder of the sewer network. Consequently, the soil surge which is produced at the onset of rain because of the scavenging action thereof is intercepted in the sewer network, the relatively large items are deposited and the lighter items are suspended. Since the deposited items slide down the steeply inclined side walls of the trough in the tank floor such items are removed automatically from the basin, even in dry weather-flow and low-gradient conditions, and supplied to the treatment plant.

Conveniently, in steeply inclined terrain two storage tanks are provided interconnected in the flow direction by a restrictor and with their inlet ends interconnected by a bypass, and the storm overflow unit is disposed on the exit or outside of the downstream tank. This feature makes it possible to provide even in inclined terrain a large storage volume whose floor and roof are disposed substantially parallel to the surface of the ground—i.e., a storage area which can be contrived without very deep excavation being necessary.

In the case of very steeply inclined terrain, the storage tank can have a floor which extends substantially parallel to the ground, and, with the tank, dam walls extending transversely of the flow direction and disposed consecutively and in vertically staggered fashion in the direction of flow, said dam walls having near the tank floor passages for the quantity of combined sewage to be removed to the clarification plant. If the storage space is devised in this way, it can be used to store combined water in the sewer route at places where, because of the very considerable drop, the water is always flowing in conditions such that its speed may become greater than the critical value.

Conveniently, to make maximum use of the storage space, the storage tank has a raised roof or ceiling near the dam walls. Consequently, in full-capacity conditions there can be a free flow of water over the dam walls even though in the rest of the tank the roof or ceiling of the storage space is very near the water level.

Figure 25:
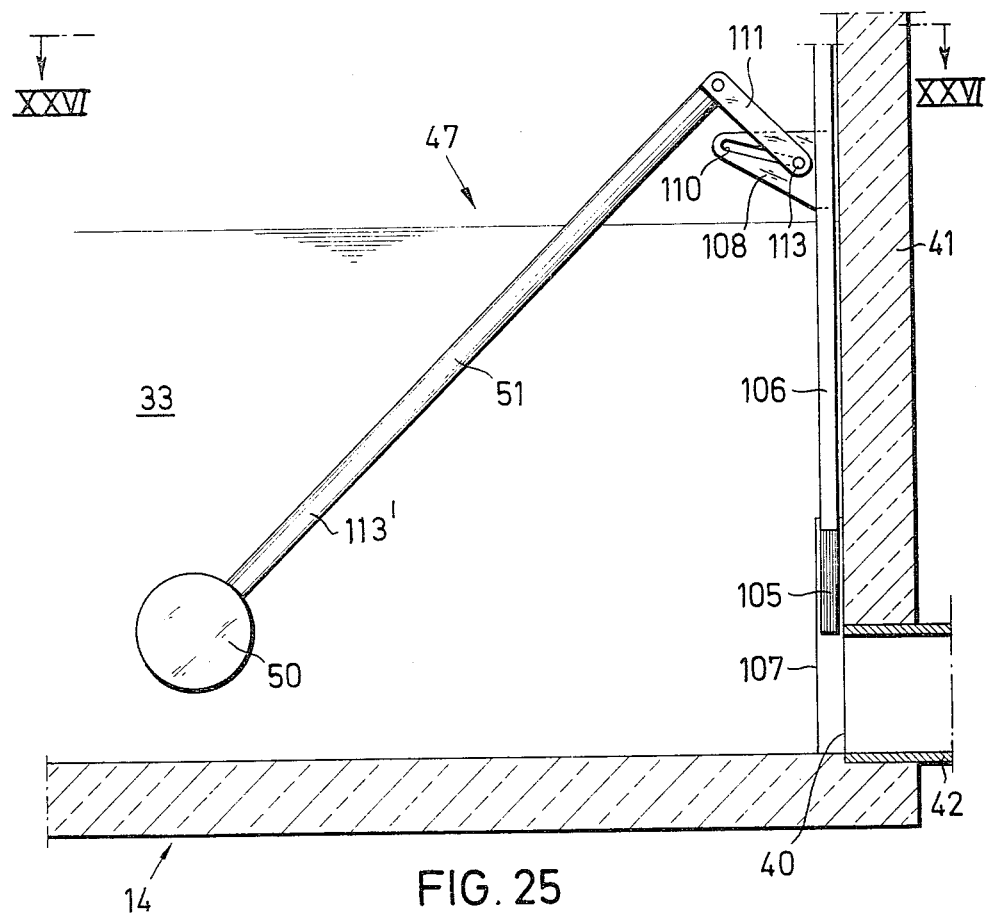
Figure 26:
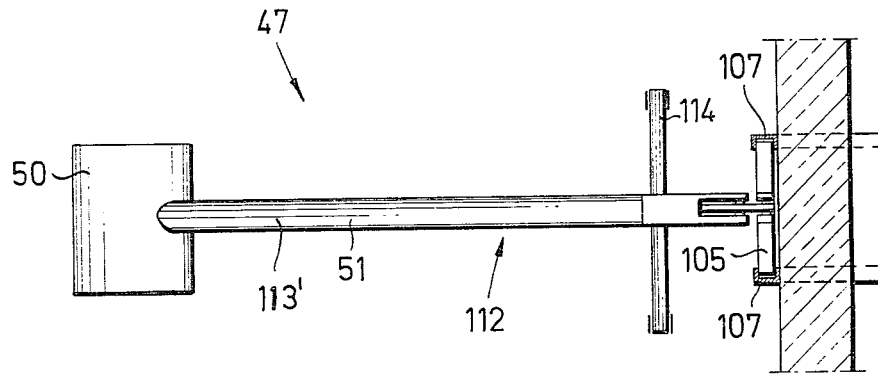
Figure 27:
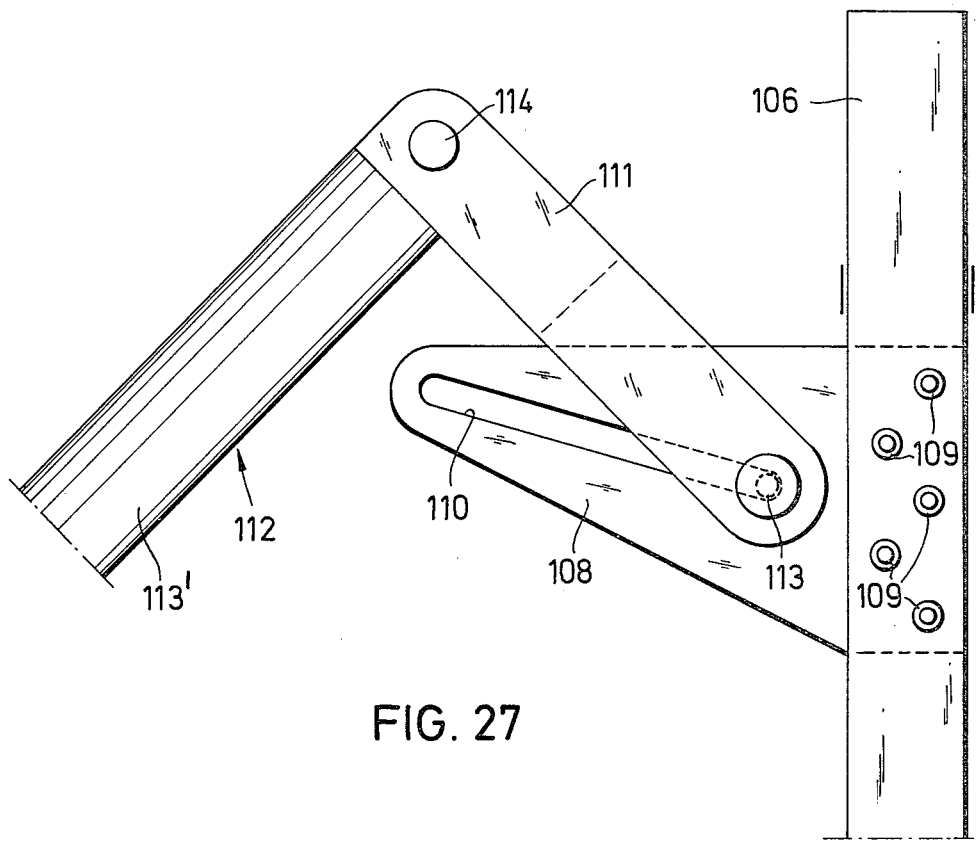
Figure 28:
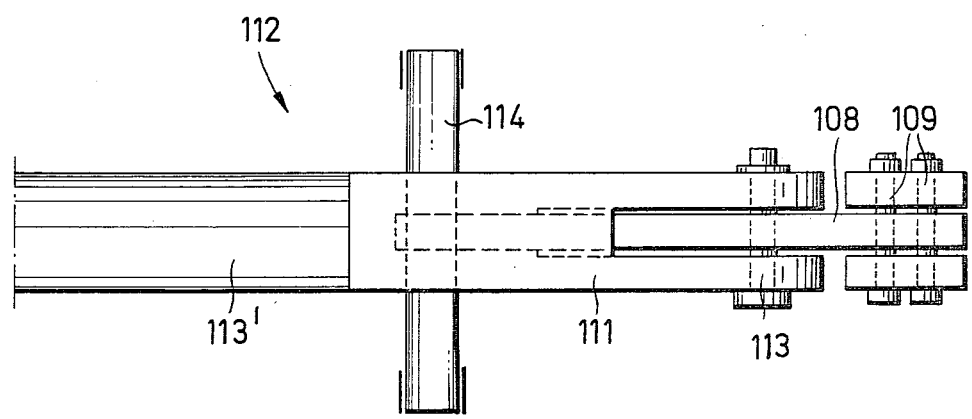
Figure 29:
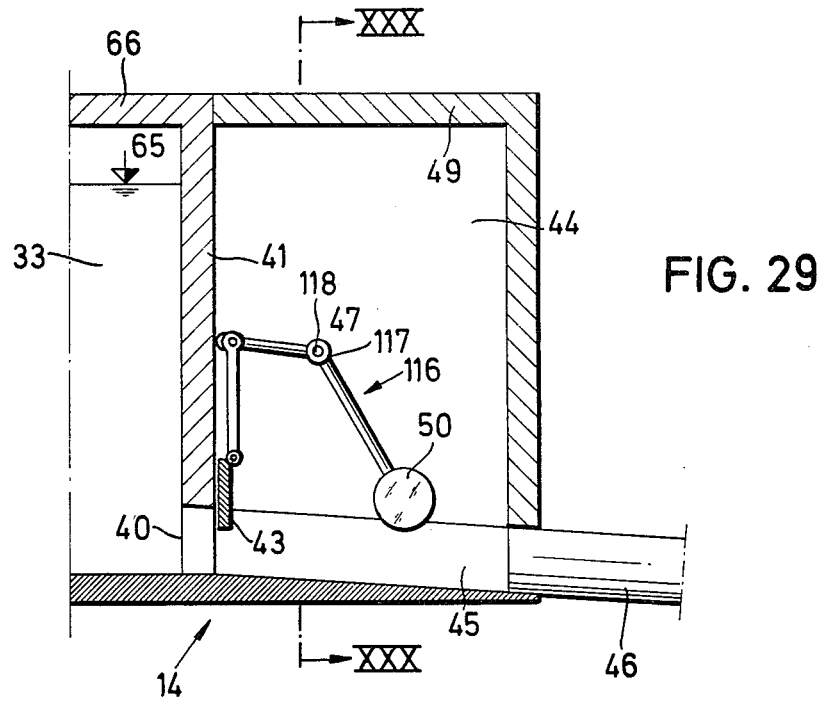
Figure 30:
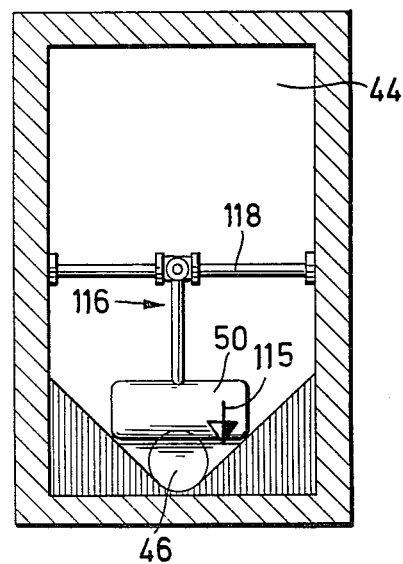

The invention will be described in greater detail with reference to embodiments shown in the drawings wherein:

FIG. 1 is a view in longitudinal section of a storm overflow basin or reservoir according to the invention, FIG. 2 is a plan view of the installation of FIG. 1, FIG. 3 shows another embodiment in longitudinal section of the storm overflow basin according to the invention, FIG. 4 is a plan view of the installation of FIG. 3, FIGS. 5 and 6 are views in longitudinal section of further embodiments of the storm overflow basin according to the invention, FIG. 7 is a plan view of the installation of FIG. 5, FIGS. 8 to 12 show various cross-sectional forms for the storage basins of the preceding figures, FIG. 13 is a plan view to a larger scale of the storm overflow unit of the storm overflow basin shown in FIGS. 1 and 2, FIG. 14 is a cross-section on the line XIV—XIV of FIG. 13, FIG. 15 is a cross-section on the line XV—XV of FIG. 13, FIG. 16 is a longitudinal section on the line XVI—XVI of FIG. 13, FIG. 17 is a plan view of another embodiment of a float-operated gate flap, FIG. 18 is a view in cross-section on the line XVIII—XVIII of FIG. 17, FIG. 19 is a plan view of a further embodiment of a float-controlled gate flap, FIG. 20 is a cross-section on the line XX—XX of FIG. 19, FIGS. 21 to 23 are views in diagrammatic side elevation of other embodiments of flap gates according to the invention, FIG. 24 is a view in diagrammatic side elevation of a float-controlled sliding flap gate according to the invention, FIG. 25 is a diagrammatic part elevation, partly in section, of a float-controlled throttling device for sewage discharge in the storm overflow facility, FIG. 26 is a horizontal section on the line XXVI—XXVI on FIG. 25, FIG. 27 is a view to a larger scale of a detail of FIG. 25, FIG. 28 is a plan view of the detail in FIG. 27, FIG. 29 is a diagrammatic view in a vertical longitudinal section of another embodiment for the arrangement of the throttling device for sewage discharge, and FIG. 30 is a view in cross-section on the line XXX—XXX of FIG. 29.

In the embodiments shown in the drawings, a storm overflow reservoir or basin 10 is disposed underground in a combined sewer network somewhere near the sewer route. In the embodiment shown in FIGS. 1 and 2 the basin 10 comprises an elongated storage volume or tank or the like 12, which is disposed below the surface 11 of the ground and is connected to a trunk main 13 of the combined network, and a storm overflow unit 14 which is connected to the tank or the like 12 at the downstream end thereof. The tank 12 can have any of the cross-sections shown in FIGS. 8 to 12. Its sill or floor 15 comprises a trough 16 which is designed for the dry weather flow (DWF) of the network and which has steeply inclined side walls 17, pieces of soil settling in the tank 12 slide towards the centre of trough 16 where they are entrained by the continually flowing sewage.

The tank 12 shown in FIGS. 1 and 2 is of use more particularly for a terrain where the grades are slight. Its capacity level 18 is at about the same height as the roof or apex line 19 of the basin 12 at the entry end 20 thereof, so that in full flow conditions the basin 12 becomes completely ponded and the root of the backwater or backup is further back in the network 13.

FIGS. 3 and 4 show a storm overflow basin or the like 10 for a sewage network in steeply inclined terrain. The basin 10 comprises two storage tanks 12a, 12b which are connected to the combined sewage network 13 and which are disposed one after the other in the flow direction. The tank 12a which is the first in the direction of flow is so disposed below the ground surface 11 that its sill or floor 15a and roof 19a extend substantially parallel to the surface 11. At its downstream end 22 the tank 12a is connected by a restrictor 21 to the second tank 12b whose sill or floor 15b and roof 19b are disposed substantially horizontally and to whose downstream end the underground storm overflow unit 14 is connected. The capacity level of the upper tank 12a is determined by a fixed weir sill 23 which is disposed laterally of entry 20 of trunk main 13 and which separates the tank 12a from a bypass 24 extending from the top end 25 of the first basin 12a to the upstream end 26 of the second tank 12b. A downflow baffle or trash board 27 at the top end of the first tank 12a retains contaminants and solids floating on the surface of the sewage. The floors 15a, 15b of the two tanks also have a dry weather floor trough 16 having steeply inclined side walls 17 as exemplified in FIGS. 8 to 12. The restrictor 21 is so devised that the dry weather flow can flow freely from the first tank 12a into the second tank 12b.

As will be apparent, in the event of a combined flow in excess of the dry weather flow, the first tank 12a fills up first, being filled completely right up to its roof 19a. Of course, combined water continues to flow through the restrictor 21 into the second tank 12b, the flow increasing because of the increasing pressure in the first tank 12a.

When the level in the first tank 12a reaches level capacity, the combined sewage discharges over the fixed weir sill 23 into the bypass 24 and goes therefrom into the second tank 12b where, in a manner to be described in greater detail hereinafter, it backs up to the capacity level 18b thereof at the storm overflow 25 of the storm overflow unit 14.

The storm overflow basins shown in FIGS. 5, 6 and 7 are for use in sewage networks situated in very steeply inclined terrain 11, where the water flowing in the pipes is moving at greater than critical velocity. To achieve ponding in such a system in an underground storage reservoir disposed substantially parallel to the terrain surface 11, a number of dam walls 26 are disposed consecutively in the flow direction through the basin 12, extending transversely of the flow direction and having near the basin floor 15 passages 27 for the critical discharge—i.e. for the quantity of water which can just be processed by the treatment plant following the storm overflow basin before the storm overflow 25 of the unit 14 becomes operative.

Because of the presence of the walls 26, a number of tanks having various capacity levels are provided in the basin 12 and there is a flow over the walls only when the inflow from the sewer network 13 exceeds the quantity of combined sewage to be discharged to the treatment plant.

So that there are no obstructions to the flow over the dam walls 26, the roof line 19 of the reservoir 12 must be far enough away from the wall overflow edges 28. So that the dead space above the water levels 29 of the different tanks may remain as limited as possible, the basin 12 shown in FIG. 6 has a raised roof 19c near each of the walls 26.

Depending upon local circumstances, the storm overflow unit 14 can have various shapes in plan and some of the shapes are shown in FIGS. 2, 4 and 7. However, since all the storm overflow unit according to the invention have common basic features, it will be sufficient if a detailed description is given of just one of them. A detailed description will therefore be given hereinafter, with reference to FIGS. 13 to 16, of the storm overflow unit associated with the storm overflow basin shown in FIGS. 1 and 2.

The storm overflow unit 14 to which the basin 12 discharges is, like the latter, placed underground near the sewer route and is accessible from the surface 11 through manholes 30 to 32. The unit 14 has a flow chamber 33 whose entry 34 is connected to the basin 12, a trash board 35 being provided at the entry 34. The chamber 33 has a floor trough 36 whose side walls 37, 38 are at an inclination of approximately 45°.

On that side 39 of the overflow unit 14 which is opposite entry 35, a trough 36 extends into a sewage discharge 40. In the embodiment shown the discharge 40 comprises a short tubular section 42 which is fitted into rear end wall 41 and whose downstream edge can be closed by a throttle flap 43. The throttle flap is disposed in a shaft or gallery or the like 44 which follows on the unit 14 and which, like the flow chamber 33, has an open-top trough 45 to which a sewage line 46 extending to the treatment plant (not shown) is connected. The throttle flap 43 is pivotally mounted on the top edge of the section 42 and can be actuated by means of an actuator 47 comprising pivoted linkage 48 mounted on the roof 49 of gallery 44 and operated by a float 50 which is disposed in flow chamber 33 and connected by a rod 51 to the linkage. Disposed in the flow chamber 33 upstream of the float 50 is a baffle 52 which ensures that the float 50 is unaffected by variations of flow pressure in the flow chamber 33. The linkage 47 is so devised that the throttle flap 43 closes increasingly as the water level in chamber 33 rises but remains fully open in dry weather flow conditions when the quantity of water flowing only partly fills the trough 36 in the flow chamber 33.

As can be gathered from FIG. 14, storm overflow 25 separates flow chamber 33 from a flood relief channel 53 leading to a receiving stream 54, such as a river or stream. The storm overflow 25 comprises a fixed weir sill 55 whose crest 56 merges on one side into the side wall 38 of the trough 36 in the flow chamber 33 and, on the opposite side, into a rounded fall or cascade 57 which in turn merges into floor 58 of channel 53. The crest edge near the channel 53 provides a closure edge or seat 59 abuttable by gate flap 60 of a flap gate 61 secured by means of spaced-apart arms 62 to a gate shaft 63 mounted on a pivot 64 which extends parallel to the crest 56. As is apparent from FIGS. 14 and 16, pivot 64 is mounted above the level capacity 65 below the roof 66 of the unit 14 and laterally spaced from the seat 59 in the chamber 33; consequently, because of its eccentric mounting the gate 60 is pressed against the seat 59 by its own weight.

Disposed downstream of the overflow 25 and adjacent the gate 61 is a float chamber 67 which is separated completely by a partition 68 from the channel 53 and which is separated by an overflow sill 69 from the chamber 33 in the unit 14 (FIGS. 13 and 15). The partition 68 merges into the baffle 52 in chamber 33 and is formed at its bottom edge with an aperture which serves as a drain passage 70 for the float chamber 67. Another drain or emptying passage 71 extends from the lowest part of chamber 67 to sewage trough 45 in gallery or shaft 44.

Disposed in the chamber 67 is a float 72 which like the gate flap 60 is secured, by means of arms 73, to the shaft 63 on pivots 64 mounted on facing end walls 41, 74 of the unit 14 and also on partition 68 between channel 53 and float chamber 67.

The unit 14 shown in FIGS. 13 to 16 operates as follows:

While the inflow to the unit 14 from the basin 12 is merely the dry weather flow, only the trough 36 of chamber 33 is full. Consequently, the float 50 is in the bottom position shown in FIG. 16 and rests on the inclined side walls 37, 38 of trough 36 in chamber 33. The throttle flap 43 is fully open, and so the sewage has an unrestricted passage into the conduit 46 extending to the treatment plant.

In the event of heavy rainfall in the catchment area of the sewer network, the sewage flow in the network mixes with the rainwater which at first carries a considerable mount of soil with it because of its scavenging action. When this sewage mixture exceeds the maximum amount permitted to be discharged to the treatment plant, the reservoir or tank 12 first fills up to its level capacity 65, the float 50 rises as the water level in chamber 33 rises, with the result that the flap 43 closes increasingly, consequently, the quantity of water entering the conduit 46 remains steady even though the water level in the flow chamber 33, and therefore the pressure at the sewage outlet 40, both rise. The float chamber 67 remains empty while the level capacity 65 is not exceeded and there is no overflow over the sill 69. The float 72 for the flap 60 acts as a closing actuator and presses the gate 61 into its closed position (shown in full lines in FIG. 14), so that no mixed sewage can flow from chamber 33 into channel 53. However, when the basin 12 is completely full and the quantity of mixed sewage inflowing to unit 14 exceeds the critical quantity ($Q_{krit}$) which can still just be supplied to the treatment plant the conduit 46, the mixed sewage overflows the sill 69 and gradually fills float chamber 67. Consequently, float 72 rises and acts by way of its arms 73 to produce a clockwise (in FIG. 14) rotation of shaft 63 and the flap opens, assisted by the water pressure acting on its inner side. Some of the water in chamber 33 can discharge over crest 56 into channel 53 and thence into the receiving stream 54.

Since the flap 60 pivots around the pivot 64 and its bottom edge 76 remains in the water, the flap taking up approximately the position shown in chain-dotted lines in FIG. 14, it retains in the chamber 33 contaminants floating on the surface of the water and allows only medium-depth mixed sewage to issue from chamber 33 into channel 53, while any contaminants which are deposited in chamber 33 are retained by the fixed weir sill 55.

When the mixed sewage inflow from the storage basin decreases or when sufficient water has discharged through channel 53 without further water inflowing from the basin 12, the float chamber starts to empty either by way of the passage 70, or, in flood conditions, by way of the passage 71. Float 72 therefore descends and the flap 60 returns to its closed position until it is in the full-line position shown in FIG. 14. The mixed sewage continues to flow through sewage discharge 40 into sewage discharge conduit 46 and therefrom to the treatment plant.

When the receiving stream 54 is in flood conditions and a backup or backwater is present in flood relief channel 53, the flap 60 holds back the flood so that the unit 14 and the reservoir 12 of the network are not flooded. The reference 77 in FIGS. 14 and 15 denotes the highest possible flood level of the receiving stream 54.

Clearly, even in flood conditions in the stream 54, combined water can be discharged from the unit 14 through the flood relief channel 53 into the stream 54 if an excess head up to the level 77, which is still below the bearings 79 for the shaft 63, is permitted in the unit 14 and basin 12.

FIGS. 17 to 24 show other embodiments of the weir or gate that can be used in the unit 14. The weir or gate shown in FIGS. 17 and 18 basically corresponds to the flap gate in the unit 14 as illustrated in FIGS. 13 to 16. A gate 80 and a float 81 are disposed one beside another on a common shaft 82 mounted in end walls 83, 84 of the unit 14 (which is not here shown in detail). The float 81, instead of being located in a separate chamber, is in a chamber 85 which is in permanent communication with the flow chamber 33 of the unit 14, consequently, the float 81, which in this case is positioned higher than in the previously described embodiment, rises when the water level in chamber 33 rises above the float bottom edge.

Referring to the embodiment shown in FIGS. 19 and 20, float 86 is mounted by means of arms 86 on a float shaft 88 indicated only by chain-dotted lines in FIGS. 19 and 20. The arms 87 and those ends of arms 89 of gate flap 90 which are opposite arms 87 carry meshing toothed segments 91, 92 so that a pivoting movement of the float 86 on the arms 87 is transmitted in the opposite rotary sense to the arms 89 and the flap 90, which thus opens as the float 86 rises and closes as the float descends.

Figures 21, 22:
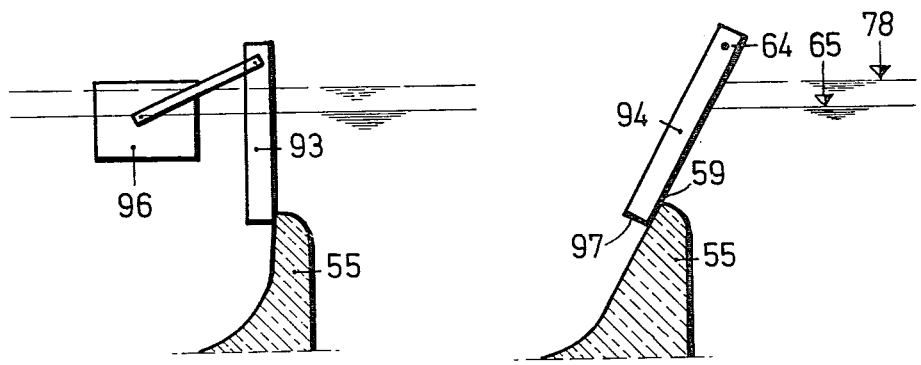

The flap gates shown in FIGS. 21 to 23 have simple flaps 93, 94, 95 respectively, which are either eccentrically mounted (FIGS. 22 and 23) or which are connected to an eccentric closing weight 96, are closed by their own weight and, when the water level rises, are opened by the water pressure acting on them. The flaps 94, 95 of the gates shown in FIGS. 22 and 23 are so devised and mounted that when in their closed position they each are inclined downwards and outwards towards a flood relief channel (not shown here in detail) with their bottom edge 97 abutting the closure edge or seat 59 of the storm overflow 55. As in the case of the flap shown in FIGS. 13 to 16, pivot 64 of flaps 94, 95 is laterally spaced from the seat 59 and above the highest water level 78 in the overflow unit. The level capacity 65 is also illustrated in these four figures.

Referring to the embodiment shown in FIG. 24, flap 98 has at its upper end 99 rollers 100 enabling the flap 98 to be guided in rails 101 and so to be displaced parallel to itself. Consequently, a gap of variable width is obtainable between the flap bottom edge 97 and the sill closure edge or seat 59, and the combined sewage can flow through such gap into the flood relief channel (not shown here in greater detail). Conveniently, flap movements are initiated by a float 102 connected by means 103, such as a cable or rope or chain or the like, to the flap upper end 99, the means 103 can e.g. run over a fixedly mounted roller 104. If it is convenient, the float 102 can be disposed in a partitioned float chamber.

In an embodiment not shown here, each of the various kinds of flap can be driven by a separate drive, e.g. an electric motor, which is started and stopped by a float in dependence upon the water level.

FIGS. 25 to 28 show another embodiment of the throttling device 47 controlling the sewage discharge 40. To facilitate the overview, like elements have the same references as in the embodiment shown in FIGS. 13 to 16. As in the latter embodiment, in the present embodiment there is disposed in flow chamber 33 of overflow unit 14 a float 50 which in the present embodiment actuates not a throttle flap but a plate 105 disposed in front of the sewage discharge outlet 40. The gate 105 is disposed at the bottom end of a guide frame 106 which is guided in a rail 107 and which carries at its top end an interchangeable cam plate 108. The cam plate 108 is secured to frame 106 by a number of bolts 109 and has a control profile 110 in the form of a slot in which one end 111 of a two-armed lever 112 engages by way of a roller or pin 113. Lever 112 carries the float at its other end 113' and is pivotally mounted on a pivot pin 114 above the highest possible water level 78 in the unit 14.

Clearly, as the float 50 rises the lever 112 pivots clockwise and pushes the plate 105 down along its guide frame 106, the element 113 sliding inwards in the slot 110. The travels of the plate 105 can be varied for a given operative movement of the float by altering the construction and arrangement of the control slot in the cam plate 108.

Of course, the plate 105 can if required be disposed on the rear of wall 41 if, as is shown in FIGS. 13 to 16, a shaft or gallery or the like is connected to the wall. Conversely, and if thought advantageous in particular circumstances, a throttle flap can be provided in the flow chamber 33 instead of the sliding plate 105.

In the embodiment of throttling device shown in FIGS. 29 and 30, the float 50 for the device is disposed in a shaft or gallery 44 which follows on from the flow chamber 33, the float 50 rising and falling in the gallery or shaft 44 in dependence upon water level 115. The float is secured to a cranked lever 116 pivotally mounted at its point of reflex 117 on a pivot 118 disposed in gallery 44, the free end of lever 116 being guided in the slot of a slider 108 (shown only diagrammatically) which is connected to throttle element 43 for closing the sewage discharge outlet 40. Clearly, controlling the element 43 in dependence upon the water level in the shaft or gallery is much simpler than controlling the throttle element in dependence upon the water level in the unit 14. Another advantage of the latter embodiment is its quicker response to disturbances, since the float drops very rapidly in the gallery in response to a reduction or complete cessation of inflow into the gallery because of a stoppage in the sewage discharge outlet 40. Also, the float and its linkage are less exposed to soiling than in the flow chamber 33 of the unit 14.

The invention is not limited to the embodiments described and shown. For instance, the unit 14 can be used in association with a storm water retention reservoir in separate sewer networks where such reservoir intercepts the surge of soil at the onset of precipitation. Also, the fixed weir sill can be completely omitted from the unit 14 and just a top-mounted flap gate used. Such a top mounted flap gate can be used not only in the sewage system for storm overflows, storm water retention reservoirs and storm water clarification reservoirs but quite generally in hydraulic engineering for weir systems and flood control reservoirs. The advantage of using flap gates having top mounted flaps in river training is that the fixed weir sill can be lower than a weir sill for a flap gate having a bottom-mounted flap. Also, no supports are needed for the flap in its operative position, washing means become unnecessary and repair work on the flap can be carried out without emergency gates or stop logs.

The device for throttling the sewage discharge is of use not only in storm overflow reservoirs or basins of the kind according to the invention but in systems for storm overflows, storm water-retention basins and storm-water clarification basins. The device is also of use in hydraulic engineering for entries to ditches and fish ladders and for exits from flood control reservoirs. The construction of the storage reservoirs, overflow facilities and their items of equipment may also be varied in many ways obvious to those skilled in the art without exceeding the scope of the invention.

What we claim and desire to be secured by Letters Patent is:

1. A storm overflow basin comprising: a flow chamber having a capacity level; at least one inlet to said flow chamber; a sewage discharge from said flow chamber; a storm overflow outlet comprising a fixed weir sill and a movable gate, said gate having a top and a bottom, said top of said gate being disposed above said flow chamber capacity level in all positions, said bottom of said gate abutting said sill in the closed position, mounting means permitting displacement of said gate such that a discharge opening is formed between said bottom of said gate and said sill; and actuating means comprising a float chamber adjacent said flow chamber defined by a floor, side walls and a lowest side wall, said lowest side wall having a top at said flow chamber capacity level such that water may flow from said flow chamber to said float chamber above said lowest side wall, said float chamber having an emptying line, and a float in said chamber controlling said gate through said actuating means.

2. A basin according to claim 1 wherein said gate mounting means comprises a pivot disposed adjacent the top of the gate and above the maximum water level thereat.

3. A basin according to claim 1 wherein said gate mounting means comprises a pivot disposed at a distance transversely from said sill.

4. A basin according to claim 1 wherein a flood relief channel is downstream of said storm overflow outlet and said gate in its closed position is inclined downwards and outwards towards said flood relief channel.

5. A basin according to claim 1 comprising gravity-biasing means acting to hold the gate closed, said means including a biasing weight spaced from an outside surface of the gate.

6. A basin according to claim 1 comprising lever means connecting the float rigidly to the gate.

7. A basin according to claim 1 comprising lever means connected to the float and gearing means connecting said lever means to the gate.

8. A basin according to claim 1 comprising a common pivot shaft on which the gate and the float are mounted one beside the other.

9. A basin according to claim 1 comprising electrical drive means operatively connecting the float to the gate.

10. A basin according to claim 1 comprising guide rails and rollers running on said rails, said rollers being mounted to an upper region of the gate whereby said rails and rollers serve for guidance of the movements of the gate.

11. A basin according to claim 1 wherein a flood relief channel extends downstream of said storm overflow outlet and the said float chamber emptying line is connected to said flood relief channel.

12. A basin according to claim 11 wherein a second emptying line extends from said float chamber to said sewage discharge.

13. A storm overflow basin comprising a flow chamber; at least one inlet to said flow chamber; a normally closed movable weir, said weir opening to form a storm overflow outlet when said flow chamber is filled to capacity; a sewage discharge connected to said flow chamber near the lowest part thereof; a sewage discharge metering means metering a constant flow to said sewage discharge, said metering means comprised of a restricting device in said sewage discharge and float controlled actuating means responsive to the water level in said overflow basin connected to said restricting device to adjust said restricting device in dependence on the water level in said basin.

14. A basin according to claim 13 wherein the restricting device is a throttle flap.

15. A storm overflow basin comprising a flow chamber; at least one inlet to said flow chamber; a normally closed weir, said weir opening to form a storm overflow outlet when said flow chamber is filled to capacity; a sewage discharge connected to said flow chamber near the lowest part thereof; a restricting device in said sewage discharge; and float controlled actuating means responsive to the water level in said overflow basin connected to said restricting device to restrict flow through said restricting device to below a preset maximum; said float controlled actuating means comprising a float, a lever, pivot means intermediate opposite ends of the lever mounting the lever above the maximum water level in the storm overflow basin, the float being connected to one said end of the lever, a cam device having means connecting it to the restricting device and a follower on the other end of the lever engaging said cam device, the connecting means of said cam device permitting interchange of the cam device.

16. A storm overflow basin comprising a flow chamber; at least one inlet to said flow chamber; a normally closed weir, said weir opening to form a storm overflow outlet when said flow chamber is filled to capacity; a sewage discharge connected to said flow chamber near the lowest part thereof; a restricting device in said sewage discharge; and float controlled actuating means responsive to the water level in said overflow basin connected to said restricting device to restrict flow through said restricting device to below a preset maximum; said sewer discharge comprising a sewage discharge line and a discharge chamber between the overflow basin flow chamber and said line, said sewage discharge line extending to said discharge chamber, said restricting device being located in said discharge chamber and said float controlled actuating means for said restricting device also being disposed in said discharge chamber.

17. A storm overflow system in a combined sewage system comprising at least one storage tank being disposed underground in said sewage system, a floor in said tank in the shape of a trough adapted to handle the dry weather flow of said sewage system and having steeply inclined side walls, a storm overflow basin having a predetermined capacity level following said tank and having an inlet from said tank, a sewage discharge and a storm overflow outlet comprising a fixed wier sill and a movable gate, said gate having a top and a bottom, said top of said gate being disposed above said overflow basin capacity level in all positions, said bottom of said gate abutting said sill in the closed position, mounting means permitting displacement of said gate such that a discharge opening is formed between said bottom of said gate and said sill, and actuating means comprising a float in a float chamber integral to said storm overflow basin defined by a floor, side walls and a lowest side wall, said lowest side wall having a top at said storm overflow basin capacity level such that water may flow over said lowest side wall when said overflow basin capacity is exceeded, said float chamber having an emptying line, said float controlling said gate through said actuating means.

18. A system according to claim 17 comprising two storage tanks, restriction means interconnecting said tanks in tandem and a bypass extending between inlet ends of the two tanks, the storm overflow basin being disposed after the two storage tanks connected to the downstream one of the two tanks.

19. A system according to claim 17 wherein the storage tank comprises a floor extending substantially parallel to the ground surface and a plurality of dam walls each extending transversely of the flow direction through the tank and the respective walls being spaced in said direction and disposed in vertically staggered fashion, passages in the dam walls near the tank floor for a critical water discharge.

20. A basin according to claim 19 wherein storage tank has a roof with raised regions adjacent the dam walls.

* * * * *